(12) United States Patent
Byth

(10) Patent No.: US 6,659,522 B2
(45) Date of Patent: Dec. 9, 2003

(54) FRUIT AND VEGETABLE HOLDING UTENSIL

(76) Inventor: Hallie Anne Byth, 314 Gershwin Dr., Houston, TX (US) 77079

(*) Notice: Subject to any disclaimer, the term of this patent is extended or adjusted under 35 U.S.C. 154(b) by 0 days.

(21) Appl. No.: 10/063,254

(22) Filed: Apr. 4, 2002

(65) Prior Publication Data

US 2003/0189347 A1 Oct. 9, 2003

(51) Int. Cl.[7] .................................................. A47J 43/18
(52) U.S. Cl. ........................................ 294/61; 99/421 A
(58) Field of Search .............................. 294/1.1, 5, 61; 99/419, 421 A, 421 R, 421 H, 421 HH, 441, 594; 269/3; 30/123.5, 123.6, 123.7

(56) References Cited

U.S. PATENT DOCUMENTS

| | | | | | |
|---|---|---|---|---|---|
| 211,388 A | * | 1/1879 | Dyer | ............................. | 294/5 |
| D25,026 S | * | 12/1895 | Bishop | ........................ | D7/685 |
| 1,391,283 A | * | 9/1921 | Suderman | ..................... | 294/5 |
| 2,182,688 A | * | 12/1939 | Buchhagen | ................... | 99/595 |
| 3,387,555 A | * | 6/1968 | Moran | ...................... | 99/421 R |
| 4,517,885 A | * | 5/1985 | Thompson | ............. | 99/421 HV |
| 4,581,990 A | * | 4/1986 | Matsumoto | ................... | 99/538 |
| 4,765,234 A | * | 8/1988 | Cailliot | ........................ | 99/593 |
| 5,495,794 A | * | 3/1996 | Ulysse | ........................ | 99/419 |

* cited by examiner

Primary Examiner—Dean J. Kramer
(74) Attorney, Agent, or Firm—Andy Arismendi, Jr.

(57) ABSTRACT

A hand held utensil adapted to hold a fruit or vegetable, for example, a potato for peeling. The device has a first elongated member, a second elongated member, a slender slightly tapered rod-like projection, and a mechanism for rotating the projection to control rotation of the fruit or vegetable when peeling same. The first elongated member has a first end and a first connecting portion. The second elongated member has an upper end, a lower end and a hand held portion between the upper and lower ends. The upper end is attached to the connecting portion and substantially perpendicular to the first elongated member. The slender slightly tapered rod-like projection axially extends forwardly of the first end. The projection terminates in a point adapted to penetrate a vegetable or fruit.

8 Claims, 3 Drawing Sheets

FRUIT AND VEGETABLE HOLDING UTENSIL

BACKGROUND OF INVENTION

This invention relates to the field of kitchen utensils, and more particularly relates to a fruit or vegetable holding utensil.

Peeling or paring fruits and vegetables is a very common task in the preparation of food. Perhaps as common as any vegetable to be handled are potatoes to be peeled and carrots to be scraped. Perhaps paring knives and potato peelers are the most widely used utensils for these purposes.

However, the problem here in each case is that the vegetable must be hand held and care must be exercised not to cut or scrape a finger.

Tong like utensils are presently used, but these are awkward in attempting to hold a vegetable with them and more often than not the vegetable slips from that hold.

U.S. Pat. No. 5,495,794 to Ulysse discloses a hand held axially aligned utensil adapted for holding a potato. This device has an elongated hand held member having a cylindrical handle. The handle has an outer end and an inner end. The inner end of said handle has an integral circular flange. A slender slightly tapered rod-like projection axially extends forwardly of the circular flange and inner end of the handle. The projection terminates in a point adapted to penetrate a vegetable. Two pairs of triangular like projections extend from the rod like projection. The first pair of projections is in opposed relation to each other and are tapered in the direction of the point of the rod like projection and have rearward upwardly extending shoulders. The second pair of triangular like projections extend above the first pair of projections and at right angles thereto. Therefore, upon being inserted into a vegetable, these shoulders hold the vegetable onto the device. A disadvantage of this device is that since it is axially aligned, it requires substantial finger, wrist and arm strength to hold the device and vegetable thereon at the appropriate angle for peeling the vegetable. The young, elderly and those with arthritic afflictions in their hands and arms would not be able to use this device effectively and safely.

Other more complicated tools and equipment for holding and peeling potatoes, for example, are available, but are primarily for large volume commercial purposes. See U.S. Pat. No. 4,765,234 to Cailliot.

It is desirable to have an appropriate hand held utensil which will conveniently and securely hold a vegetable such as a potato while it is being peeled by being inserted thereinto and such a utensil is provided by the invention herein.

SUMMARY OF INVENTION

This invention relates to a hand held kitchen utensil particularly adapted to securely hold a fruit or a vegetable, for example, a potato, while the fruit or vegetable is being peeled.

DETAILED DESCRIPTION

Figure 1:
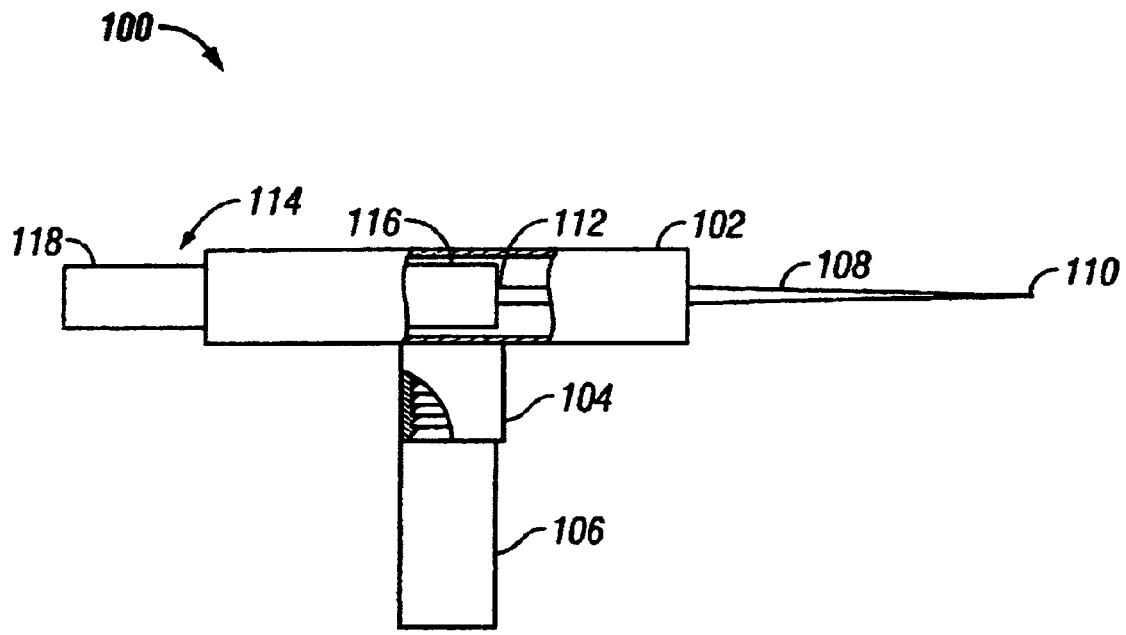
FIG. 1 shows a side elevation in partial cross-section of one embodiment of the present invention.

With reference to the drawings where like numerals denote like or similar elements and particularly to FIG. 1, there is shown an embodiment of a hand held vegetable or fruit holding utensil or device 100 according to the present invention. The utensil 100 has a T-shaped tubular member 102, a handle portion 106 connected to the T-shaped member 100 at connection portion 104. The utensil 100 also has an ice pick device having a rod-like member 108 and an elongated member 114. The rod-like member 108 has one end ending in a point 110 and a connecting end 112 opposite end 110. The elongated member 114 has a first end 118 and a second end 116. The connecting end 112 is attached to the second end 116. The elongated member 114 is positioned within the horizontal portion of the T-shaped tubular member 102 and the first end 118 extends beyond the end of this horizontal portion opposite the ending point 110. In this position, the first end 118 can be rotated about the longitudinal axis of the elongated member 114 thereby rotating the rod-like member 108.

In use, the rod-like member 108 point end first 110 is inserted into a fruit or vegetable, for example, a potato. Handle portion 106 is grasped by one of the hand of the user. This position places less angular stress on the wrist of this hand than that disclosed in U.S. Pat. No. 5,495,794, since in this embodiment the hand is positioned relatively under the axis of the rod-like member 108 and the potato thereon with the under side of the horizontal portion of the elongated member 102 resting upon the upper portion of the hand holding the handle portion 106. This is a less strenuous and more stable position. Further, the horizontal portion of the elongated member 102 shields the hand holding the handle portion 106 from a commonly used peeling utensil, for example, a potato peeler or paring knife, (not shown) held by the user's other hand, when using the peeler to peel the potato.

Figure 2:
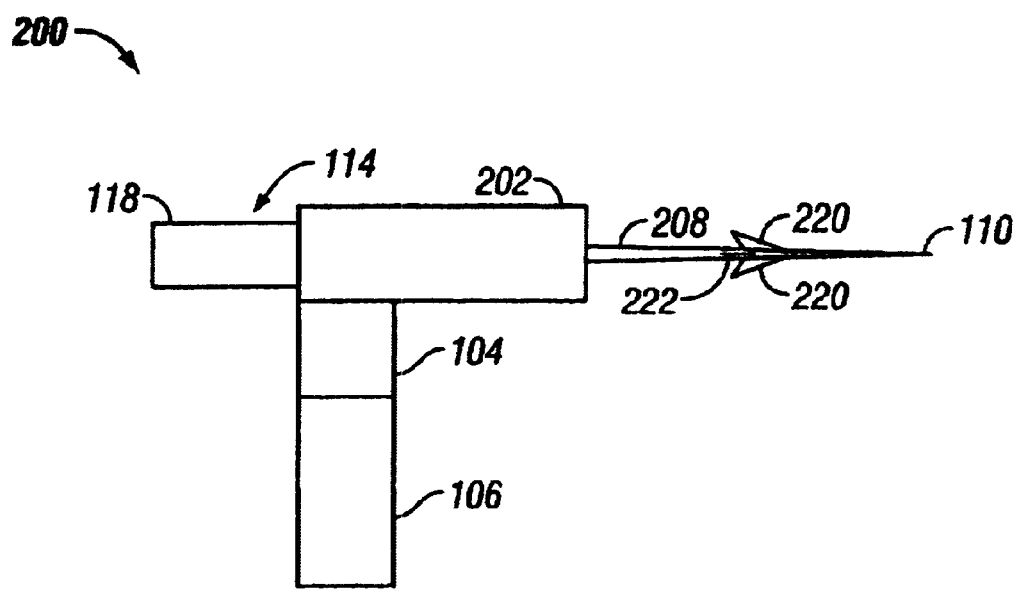
FIG. 2 shows a side elevation of a second embodiment of the present invention.

Referring now to FIG. 2, there is shown another embodiment of a hand held vegetable or fruit holding utensil or device 200 according to the present invention. The utensil 200 is similar to utensil 100, except that utensil 200 has an inverted L-shaped tubular member 202 rather than a T-shaped tubular member 102. Utensil 200 also differs from utensil 100 in that rod-like member 208 has triangular shaped projections 220 and 222, whereas rod-like member 108 does not have these triangular shaped projections. The triangular shaped projections 220 and 222 are similar to those in U.S. Pat. No. 5,495,794, incorporated herein by reference, and secure the potato, for example, once the rod-like member 208 is inserted therein, preventing unintentional withdrawal of the rod-like member 208 from the potato. As with utensil 100, the connecting end 112 is attached to the second end 116. In this case, the elongated member 114 is positioned within the horizontal portion of the inverted L-shaped tubular member 202 and the first end 118 extends beyond the end of this horizontal portion opposite the ending point 110.

Figure 3:
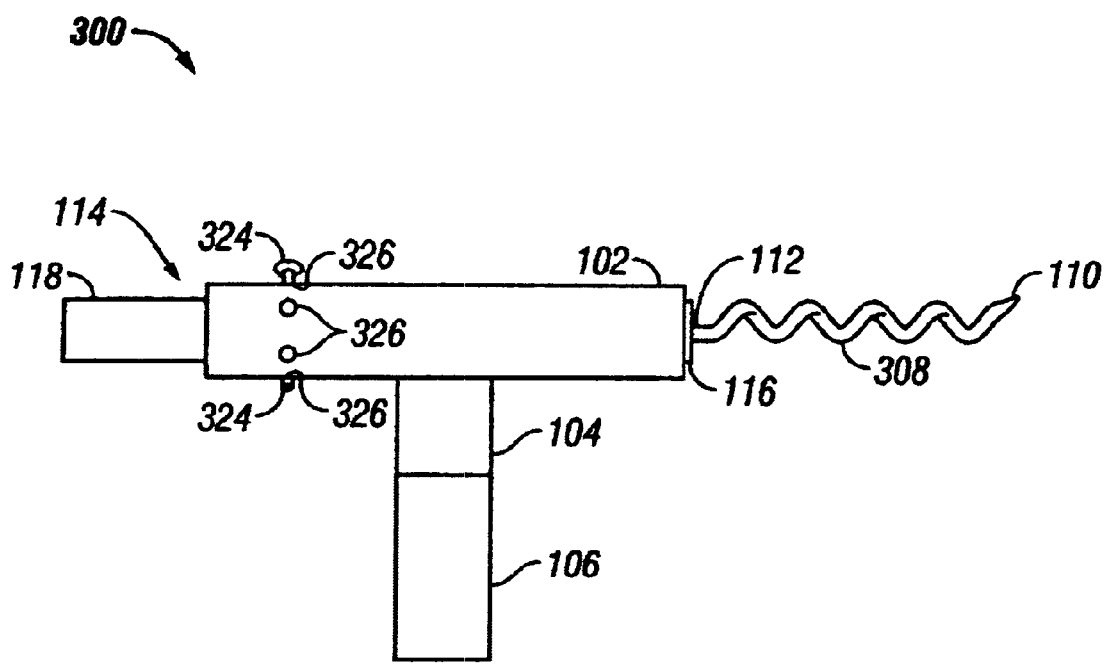
FIG. 3 shows a side elevation of a third embodiment of the present invention.

Referring now to FIG. 3, there is shown another embodiment of a hand held vegetable or fruit holding utensil or device 300 according to the present invention. The utensil 300 is similar to utensil 100, except that the straight portion of rod-like member 108 between the point end 110 and the connecting end 112 is replaced by a helical portion and is called a cork screw member 308. In use, the potato, for example, is is rotated while inserting the corkscrew member 308. This secures the potato in position while peeling it. The end portion of the horizontal portion of the T-shaped member 102 has a series of axially spaced holes 326 about the perimeter thereof. The elongated member 114 has a hole (not shown) extending therethrough whose axis intersects the longitudinal axis of the elongated member 114. A locking pin 324 is inserted through a corresponding pair of holes 326 aligned with the hole in the elongated member 114. The locking pin serves two purposes. The first is to secure the elongated member 114 within the horizontal portion of member 102 such that it is not accidentally withdrawn when peeling a potato, for example. The second is to allow rotation of the elongated member 114 to a particular position about its longitudinal axis to expose an unpeeled portion of the potato and maintain such position until it is desired to further rotate the elongated member 114 or the potato is completely peeled.

Figure 4:
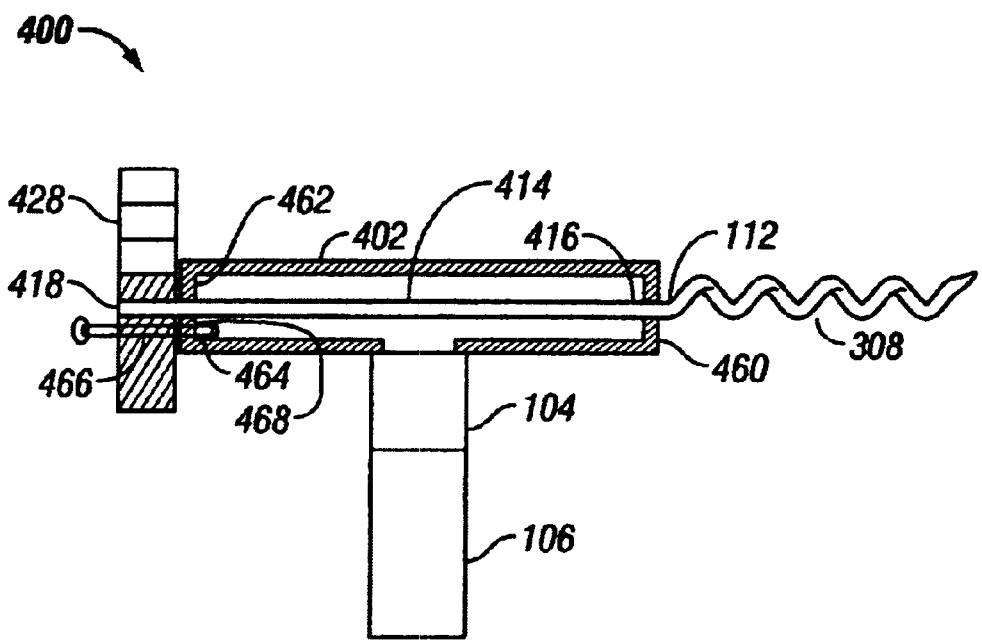
FIG. 4 shows a side elevation in partial cross-section of a fourth embodiment of the present invention.

Referring now to FIG. 4, there is shown another embodiment of a hand held vegetable or fruit holding utensil or device 400 according to the present invention. The utensil 400 is similar to utensil 300, except that the elongated member 414 is a rod-like member connected on one end 416 to the connecting end 112 and the other end 418 is connected to a knurled hand wheel 428 to effect rotation of elongated member 416. The horizontal portion of member 402 has a first face plug 460 and a second face plug 462, each having a hole therethrough to allow ends 416 and 418 to be exposed. Face plug 462 has a second hole 468 therethrough. The knurled hand wheel 428 has a plurality of locking holes 466 at a certain radius from the center of the knurled hand wheel 428. A locking pin 464 can be inserted in to one of the locking holes 466 aligned with the hole 468 to prevent inadvertent rotation of the elongated member 414 and potato (not shown).

Figure 5:
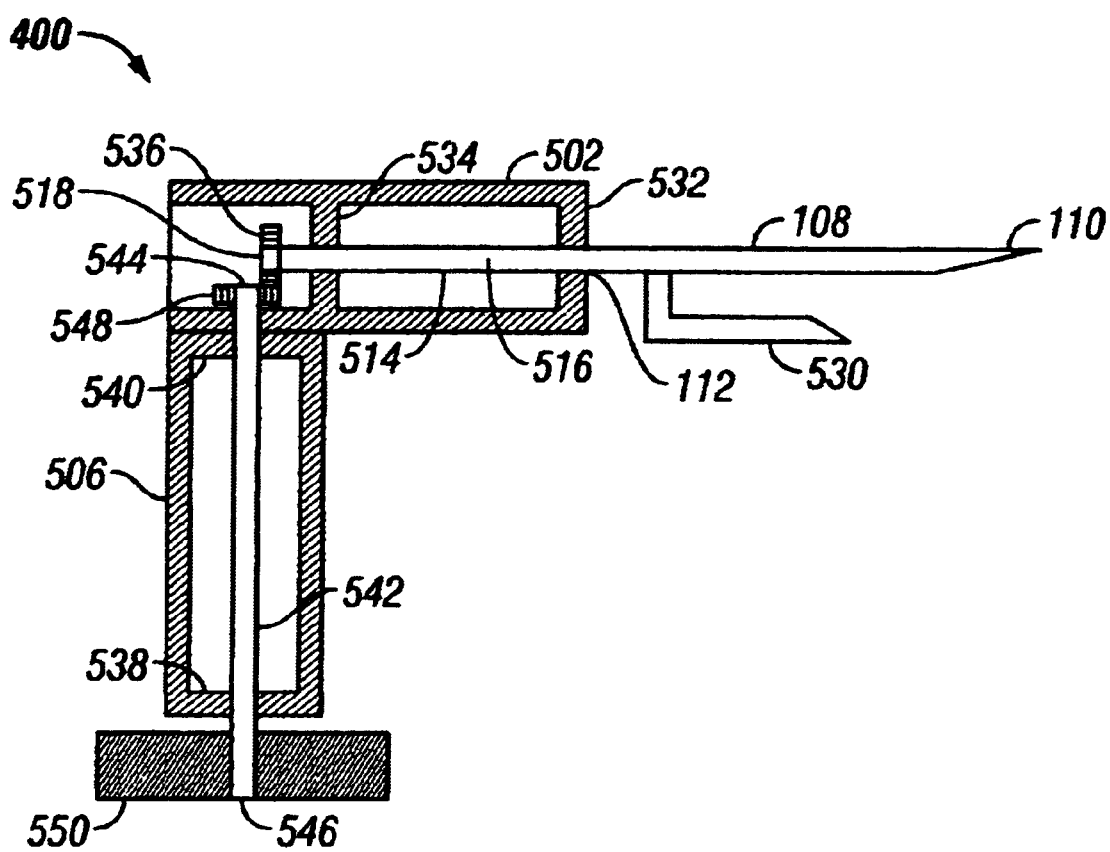
FIG. 5 shows a side elevation in partial cross-section of a fifth embodiment of the present invention.

Referring now to FIG. 5, there is shown another embodiment of a hand held vegetable or fruit holding utensil or device 500 according to the present invention. The utensil 500 is similar to utensil 200, except that the elongated member 514 is a rod-like member connected on one end 516 to the connecting end 112 and the other end 518 is connected to a gear wheel 536. Utensil 500 also differs from utensil 200 in that rod-like member 108 has an L-shaped rod-like member 530, whereas rod-like member 208 has triangular shaped projections 220 and 222. Additionally, connection portion 104 and member 106 are combined into one unit as member 506. The horizontal portion of L-shaped member 502 has a first plug 532 and a second plug 534 each having a hole centrally located therethrough to allow the ends 516 and 518 to extend therethrough. Hand held member 506 has a first plug 538 and a second plug 540 with a hole in each. The device 500 also has a rod-like member 542 with ends 544 and 546, and a gear wheel 544. Ends 544 and 546 extend through holes in plugs 540 and 538, respectively. Gear wheel 548 is on end 544 and a knurled hand wheel 550 is on end 546. When the knurled hand wheel 550 is rotated, gear wheel 548 is rotated which in turn rotates gear wheel 536 and rod-like member 108, thereby rotating the potato, for example.

What is claimed is:

1. A hand held vegetable or fruit holding device, the device comprising:
   a first elongated member, having a first end and a first connecting portion;
   a second elongated member, having an upper end, a lower end and a hand held portion between the upper and lower ends;
   wherein the upper end is attached to the connecting portion and substantially perpendicular to the first elongated member;
   a slender slightly tapered rod-like projection axially extending forwardly of the first end, the projection terminating in a point adapted to penetrate a vegetable or fruit; and
   means for rotating the projection to control rotation of the fruit or vegetable when peeling same,
   wherein the means for rotating the projection comprises a third elongated member having a rotation portion, a mid portion and a second connecting portion, wherein the mid portion is between the rotation and second connecting portions,
   wherein
     the first elongated member has a second end and an axially located hole extending through the first elongated member from the first end to the second end,
     the projection has an opposite end,
     the opposite end is attached to the second connecting portion, and
     the third elongated member is at least partially located within the hole in the first member.

2. The device of claim 1, further comprising means for preventing the rotation of a fruit or vegetable about the projection once penetrated while peeling the fruit or vegetable.

3. The device of claim 2, where the means for preventing rotation of a fruit or vegetable comprises a pair of triangular projections extending from said rod like projection in opposed relation to each other and being tapered in the direction of said point of said rod like projection.

4. The device of claim 3, wherein each of the pair of triangular projections having rearward upwardly extending shoulders.

5. The device of claim 3, wherein the means for preventing rotation further comprises a second pair of triangular projections on the projections extending above the first pair of projections and at right angles thereto.

6. The device of claim 1, wherein the first connecting portion is located at the second end and the first and second elongated members form an inverted L shape.

7. The device of claim 1, wherein the first connecting portion is located between the first and second ends and the first and second members form a T shape.

8. The device of claim 1, wherein the means for rotating the projection further comprises:
   a rotation imposing member engaging the rotation portion.

* * * * *